(12) United States Patent
Shimada et al.

(10) Patent No.: US 12,172,392 B2
(45) Date of Patent: Dec. 24, 2024

(54) COMPOSITE-MATERIAL AIRCRAFT PART AND METHOD OF MANUFACTURING SAME

(71) Applicant: Kawasaki Jukogyo Kabushiki Kaisha, Kobe (JP)

(72) Inventors: Naoki Shimada, Nagoya (JP); Yoshihiro Nakayama, Konan (JP); Sayaka Ochi, Kakamigahara (JP); Kenshirou Okumura, Kani (JP); Shouhei Kanazawa, Kakamigahara (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 615 days.

(21) Appl. No.: 17/218,170

(22) Filed: Mar. 31, 2021

(65) Prior Publication Data

US 2021/0229377 A1  Jul. 29, 2021

Related U.S. Application Data

(63) Continuation of application No. PCT/JP2019/038887, filed on Oct. 2, 2019.

(30) Foreign Application Priority Data

Oct. 3, 2018 (JP) ................................. 2018-187994

(51) Int. Cl.
*B32B 3/30* (2006.01)
*B29C 70/44* (2006.01)
(Continued)

(52) U.S. Cl.
CPC .............. *B29C 70/44* (2013.01); *B29C 70/46* (2013.01); *B29C 70/465* (2013.01); *B29C 70/54* (2013.01);
(Continued)

(58) Field of Classification Search
CPC .......... B32B 3/263; B32B 3/26; B32B 3/266; B32B 3/30; B32B 5/02; B32B 5/26;
(Continued)

(56) References Cited

U.S. PATENT DOCUMENTS 4,966,802 A * 10/1990 Hertzberg ............. B29C 66/112
428/113
2010/0028616 A1    2/2010 Yamanouchi et al.
(Continued)

FOREIGN PATENT DOCUMENTS

JP       2010-18723 A      1/2010
JP       2010-23449 A      2/2010
(Continued)

*Primary Examiner* — Catherine A. Simone
(74) *Attorney, Agent, or Firm* — XSENSUS LLP

(57) ABSTRACT

An aircraft structure (such as a T-shaped structure, a convex structure, a curved structure, or the like) includes: a laminated structure including composite-material layers that are laminated; and wherein the composite material aircraft structure is a three-dimensional structure that includes at least one of a standing structure, a convex structure, or a curved structure. The composite-material layers include at least a composite-material layer in which a reinforced fiber is a single continuous fiber, wherein the single continuous fiber includes a partial slit region. When a thickness of a flat-plate formed body including a same laminated structure as the aircraft structure but not including the three-dimensional structure, is defined as a reference thickness, the aircraft structure includes a thin plate region which has a thickness that is smaller than the reference thickness while maintaining the laminated structure.

8 Claims, 7 Drawing Sheets

(51) Int. Cl.

| | |
|---|---|
| *B29C 70/46* | (2006.01) |
| *B29C 70/54* | (2006.01) |
| *B29K 101/10* | (2006.01) |
| *B29K 307/04* | (2006.01) |
| *B29L 31/30* | (2006.01) |
| *B32B 3/26* | (2006.01) |
| *B32B 5/02* | (2006.01) |
| *B32B 5/26* | (2006.01) |
| *B64C 1/00* | (2006.01) |
| *B64C 1/06* | (2006.01) |
| *B64F 5/10* | (2017.01) |

(52) U.S. Cl.
CPC ............... *B32B 3/26* (2013.01); *B32B 3/263* (2013.01); *B32B 3/266* (2013.01); *B32B 3/30* (2013.01); *B32B 5/02* (2013.01); *B32B 5/26* (2013.01); *B64C 1/064* (2013.01); *B64F 5/10* (2017.01); *B29K 2101/10* (2013.01); *B29K 2307/04* (2013.01); *B29L 2031/3076* (2013.01); *B32B 2260/023* (2013.01); *B32B 2260/046* (2013.01); *B32B 2262/106* (2013.01); *B32B 2605/18* (2013.01); *B64C 2001/0072* (2013.01)

(58) Field of Classification Search
CPC ........ B32B 2260/023; B32B 2260/046; B32B 2262/106; B32B 2605/18; B64C 1/064; B29C 70/44; B29C 70/46; B29C 70/465; B29C 70/54
See application file for complete search history.

(56) References Cited

U.S. PATENT DOCUMENTS

| | | |
|---|---|---|
| 2015/0321429 A1 | 11/2015 | Soula et al. |
| 2016/0016382 A1 | 1/2016 | Ishikawa et al. |
| 2019/0077048 A1* | 3/2019 | Fujita ............... B32B 27/30 |
| 2020/0398461 A1 | 12/2020 | Tsumura et al. |

FOREIGN PATENT DOCUMENTS

| | | | |
|---|---|---|---|
| JP | 2010-30193 A | 2/2010 | |
| JP | 2014-172241 A | 9/2014 | |
| JP | 2015-214151 A | 12/2015 | |
| WO | 2008/38429 A1 | 4/2008 | |
| WO | 2014/142061 A1 | 9/2014 | |
| WO | WO-2017159567 A1 * | 9/2017 | ............ B29B 11/16 |
| WO | 2019/188195 A1 | 10/2019 | |
| WO | 2020/116343 A1 | 6/2020 | |

* cited by examiner

Fig. 1A
Fig. 1B
Fig. 1C
Fig. 1D
Fig. 1E
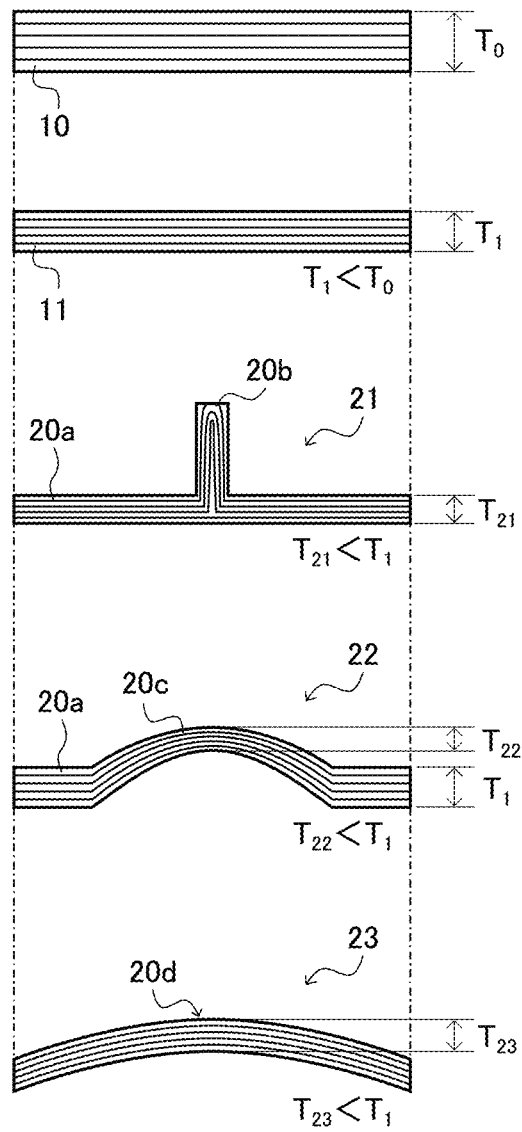
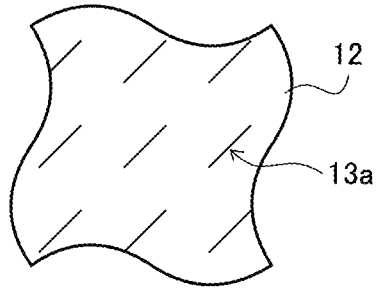
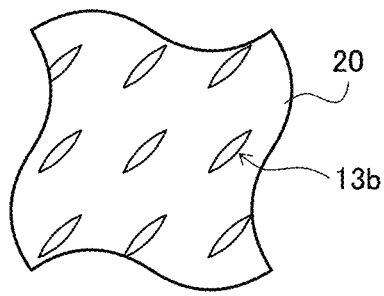
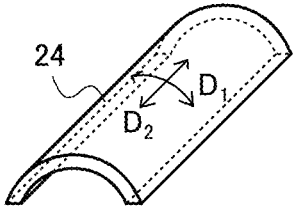
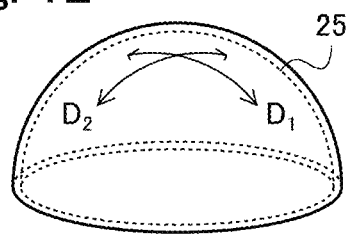

COMPOSITE-MATERIAL AIRCRAFT PART AND METHOD OF MANUFACTURING SAME

CROSS-REFERENCE TO RELATED APPLICATIONS

The present application claims priority to PCT/JP2019/038887, filed Oct. 2, 2019, which claims priority from Japanese Application No. 2018-187994, filed Oct. 3, 2018, the entire contents of each are incorporated herein by its reference.

TECHNICAL FIELD

The present disclosure relates to a composite-material aircraft part and a method of manufacturing the composite-material aircraft part. Particularly, the present disclosure relates to a composite-material aircraft part suitable as a small part which is manufactured in relatively large quantities, and a method of manufacturing the composite-material aircraft part.

BACKGROUND ART

In recent years, fiber-reinforced resin composite materials (hereinafter suitably abbreviated as "composite materials") are widely used in fields in which metal materials have been used. Among the composite materials, carbon-fiber reinforced plastic (CFRP) which is formed by using carbon fiber as reinforced fiber and impregnating the carbon fiber with matrix resin such as epoxy resin is smaller in weight and higher in strength than the metal material. Therefore, known as composite-material parts in the field of aircrafts are large structural parts, such as wings and bodies.

Typically, when manufacturing the composite-material parts in the field of aircrafts, a manufacturing method using autoclave molding is used. However, since a molding time of the autoclave molding is relatively long, the autoclave molding is generally unsuitable for mass production. Since the number of above-described large structural parts per aircraft is small, the autoclave molding can be used. On the other hand, when manufacturing the small parts the number of which per aircraft is larger, it may be difficult to efficiently manufacture the small parts by autoclave molding.

Due to an increase in air transport business demand in recent years, the improvement of flight operation efficiency of aircrafts has been desired. Therefore, demand for medium aircrafts and small aircrafts, rather than large aircrafts, tends to be increasing. As the demand for the medium aircrafts and the small aircrafts increases, the number of aircrafts manufactured per month also increases, and therefore, the manufacturing efficiency needs to be further improved. Since the composite-material aircraft parts are smaller in weight and higher in strength as described above, the composite-material aircraft parts are especially suitable as parts for the medium aircrafts and the small aircrafts. However, it is thought that when not only large parts but also small parts are manufactured by the autoclave molding, it is difficult to realize adequate manufacturing efficiency.

For example, if the number of skins constituting the body of the aircraft is $10^1$ per aircraft, the number of beams as long parts is $10^2$ per aircraft, and each of the number of stringers as long parts and the number of frames as long parts is $10^3$ per aircraft, i.e., several thousand per aircraft. Further, several thousands of types of smaller parts exist, such as clips, having different shapes from each other, and the number of such smaller parts per aircraft is $10^4$ per aircraft, i.e., several tens of thousands per aircraft. As above, each of the number of long parts and the number of small parts such as clips is several thousand to several tens of thousands per aircraft. Therefore, it is thought that if such parts are formed by using the composite material and the autoclave molding, the manufacturing efficiency significantly deteriorates.

Therefore, techniques for efficiently manufacturing composite-material aircraft parts at low cost have been conventionally proposed. For example, PTL 1 discloses a method of simply manufacturing a part (long part) having a thin and long entire shape by using a composite material at low cost. According to this method, a composite-material part for an aircraft structure is manufactured by: subjecting a composite material to pultrusion to obtain a preshaped object in which resin is partially polymerized; preparing a reinforcing element in which resin is partially polymerized; adding the reinforcing element to the preshaped object; and completing the polymerization of the resin.

CITATION LIST

Patent Literature

PTL 1: Japanese Laid-Open Patent Application Publication No. 2015-214151

SUMMARY

A composite-material aircraft structure according to the present disclosure includes: a laminated structure including composite-material layers that are laminated, wherein each composite-material layer includes at least a reinforced fiber and a resin composition. The composite material aircraft structure is a three-dimensional structure that includes at least one of a standing structure, a convex structure, and a curved structure. The composite-material layers include at least a composite-material layer in which the reinforced fiber is a single continuous fiber, wherein the single continuous fiber includes a partial slit region. When a thickness of a flat-plate formed body including a same laminated structure as the composite-material aircraft structure, but not including the three-dimensional structure, is defined as a reference thickness, the composite-material aircraft structure includes a thin plate region which has a thickness that is smaller than the reference thickness while maintaining the laminated structure. The reinforced fiber further includes a notch region in which partial slits of the partial slit region are in an open state.

A method of manufacturing a composite-material aircraft structure according to the present disclosure includes: forming a laminated body by laminating composite-material layers, wherein each composite-material layer includes a reinforced fiber and a resin composition; and placing the laminated body at a forming die and subjecting the laminated body to heating-pressurizing forming. The composite-material layers include a composite-material layer that includes at least a single reinforced fiber and a resin composition, the single reinforced fiber including a slit region, the slit region including partial slits. The forming die includes a female structure and a male structure fitted to the female structure, and a cavity formed between the male structure and the female structure includes a region where at least one of a standing structure, a convex structure, or a curved structure is formed as a three-dimensional structure. the slit region is formed at the composite-material layer such that when the laminated body is placed on the forming die, the slit region is located on at least one of a region corresponding to the three-dimensional structure or a region adjacent to the region corresponding to the three-dimensional structure.

A composite-material aircraft structure according to the present disclosure includes: the laminated structure including composite-material layers that are laminated, wherein each composite-material layer includes at least a reinforced fiber and a resin composition. The composite material aircraft structure is a three-dimensional structure that includes at least one of a standing structure, a convex structure, and a curved structure. The composite-material layers include at least a composite-material layer in which the reinforced fiber is a single continuous fiber, wherein the single continuous fiber includes a partial slit region. When a thickness of a flat-plate formed body including a same laminated structure as the composite-material aircraft structure, but not including the three-dimensional structure, is defined as a reference thickness, the composite-material aircraft structure includes a thin plate region which has a thickness that is smaller than the reference thickness while maintaining the laminated structure.

The above object, other objects, features, and advantages of the present disclosure will be made clear by the following detailed explanation of preferred embodiments with reference to the attached drawings.

BRIEF DESCRIPTION OF DRAWINGS

FIG. 1A is a diagram schematically showing a comparison among sections of examples of a composite-material aircraft part according to an embodiment of the present disclosure and a prepreg laminated body that is a material of the composite-material aircraft part. FIG. 1B is a partial plan view schematically showing one example of slit portions included in a reinforced fiber of the prepreg laminated body shown in FIG. 1A. FIG. 1C is a partial plan view schematically showing one example of notch portions included in the reinforced fiber of the aircraft part shown in FIG. 1A. FIGS. 1D and 1E are schematic perspective views each showing one example of a curved member among the aircraft parts shown in FIG. 1A.

DESCRIPTION OF EMBODIMENTS

Figure 2:
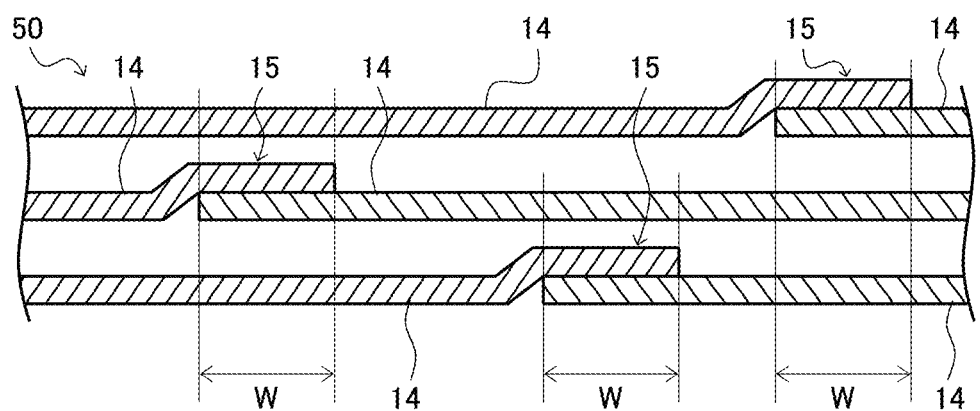
FIG. 2 is a schematic exploded sectional view showing one example of joint portions which are not included in the composite-material aircraft part according to the embodiment of the present disclosure but are included in conventional composite-material aircraft parts.

Hereinafter, an exemplary embodiment of the present disclosure will be described with reference to the drawings. In the following description and the drawings, the same reference signs are used for the same or corresponding components, and a repetition of the same explanation is avoided.

Composite-Material Aircraft Part

First, one example of a composite-material aircraft part according to the present disclosure will be specifically described with reference to FIGS. 1A to 1C.

The composite-material aircraft part (hereinafter suitably abbreviated as an "aircraft part") according to the present disclosure includes a laminated structure formed by laminating composite-material layers each including at least a reinforced fiber and a resin composition and further includes, as a three-dimensional structure, at least one of a standing portion, a convex portion, or a curved portion. In each of the composite-material layers constituting the laminated structure, the reinforced fiber is constituted by a single continuous fiber not including a joint portion and includes partial slit portions. Further, when the thickness of a flat-plate formed body including the same laminated structure as the composite-material aircraft part but not including the three-dimensional structure is regarded as a reference thickness, the aircraft part according to the present disclosure includes a thin plate portion which has a thickness smaller than the reference thickness while maintaining the laminated structure, and the reinforced fiber includes notch portions that are the slit portions in an open state.

In the example of FIG. 1A, a prepreg laminated body 10 that is a material of the aircraft part is shown at an uppermost stage and includes a laminated structure formed by laminating composite-material layers. A flat-plate formed body 11 formed in a flat plate shape by heating and pressurizing the prepreg laminated body 10, i.e., a conventional formed body not including the three-dimensional structure is shown at a second stage in FIG. 1A. A T-shaped member 21, a convex member 22, and a curved member 23 are respectively shown at a third stage, a fourth stage, and a fifth stage in FIG. 1A and are typical examples of the aircraft parts.

The T-shaped member 21 includes, as the three-dimensional structure, a standing portion 20b standing on a flat substrate portion 20a. The convex member 22 includes a convex portion 20c as the three-dimensional structure. The convex portion 20c projects at, for example, a middle portion of the substrate portion 20a so as to bulge with respect to a surface direction (spreading direction) of the substrate portion 20a. The curved member 23 has an entirely curved shape, i.e., includes a curved portion 20d as the three-dimensional structure.

As described above, in the present disclosure, the aircraft part, such as the T-shaped member 21, the convex member 22, or the curved member 23, having the three-dimensional structure is manufactured by subjecting the prepreg laminated body 10 to press forming. The prepreg laminated body 10 is formed by laminating prepregs (semi-cured composite-material layers). Therefore, the aircraft part manufactured by using the prepreg laminated body 10 as a material of the aircraft part is a part in which cured composite-material layers are laminated (i.e., a part having the laminated structure).

The composite-material layer is constituted by at least the reinforced fiber and the resin composition. In the present disclosure, the composite-material layers include at least a composite-material layer including a single reinforced fiber which includes a slit region containing partial slit portions but does not include the joint portion. Specifically, as schematically shown in, for example, FIG. 1B, the composite-material layer 12 (i.e., the prepreg) before the forming includes a region (slit region) where partial slit portions 13a are formed. As described below, this slit region may be formed at part of the composite-material layer 12 or may be formed throughout the entire composite-material layer 12. It should be noted that the joint portion not included in the aircraft part according to the present disclosure will be described later.

All of the reinforced fibers of the composite-material layers 12 constituting the prepreg laminated body 10 may include the slit regions, or some of the reinforced fibers may not include the slit regions. When the composite-material layer 12 in which the reinforced fiber includes the slit region is referred to as a "first composite-material layer" for convenience of explanation, the composite-material layer in which the reinforced fiber does not include the slit region may be referred to as a "second composite-material layer." In the present disclosure, each of the reinforced fiber constituting the first composite-material layer and the reinforced fiber constituting the second composite-material layer is a single reinforced fiber not including the joint portion, i.e., the single composite-material layer includes a reinforced fiber layer and does not include plural reinforced fiber layers.

As described above, the aircraft part manufactured by subjecting the prepreg laminated body 10 to the press forming includes the three-dimensional structure (the standing portion 20b, the convex portion 20c, the curved portion 20d, or the like). In the first composite-material layer (i.e., the composite-material layer in which the reinforced fiber includes the slit portions 13a) among the cured composite-material layers constituting the aircraft part, the reinforced fiber is stretched in the press forming, and with this, most of the slit portions 13a open. The open states of the opened slit portions 13a are maintained by the curing of the resin composition. Therefore, as shown in, for example, FIG. 1C, notch portions 13b that are the opened slit portions 13a are formed on the manufactured aircraft part 20.

Further, the obtained aircraft part necessarily includes the thin plate portion. When the thickness of the flat-plate formed body 11 formed in a flat plate shape by subjecting the prepreg laminated body 10 to heating-pressurizing forming for obtaining appropriate quality is referred to as a "reference thickness," the thin plate portion is a portion having a thickness that is smaller (thinner) than the reference thickness while maintaining the laminated structure. The reference thickness will be specifically described below.

As shown at the uppermost stage in FIG. 1A, the thickness of the prepreg laminated body 10 before the forming is a thickness $T_0$. As shown at the second stage in FIG. 1A, the thickness of the flat-plate formed body 11 obtained by subjecting the prepreg laminated body 10 to the heating-pressurizing forming under a standard condition is a thickness $T_1$. The prepreg laminated body 10 is formed by laminating prepregs, each of which is a single composite-material layer. Therefore, gaps are formed between the layers, and air gets into between the layers. On the other hand, the layers of the flat-plate formed body 11 strongly stick to each other by the heating-pressurizing forming. Therefore, the gaps between the layers of the prepreg laminated body 10 disappear, and the air between the layers is practically removed. On this account, the thickness $T_1$ of the flat-plate formed body after the forming is smaller than the thickness $T_0$ of the prepreg laminated body 10 before the forming ($T_1<T_0$). The thickness $T_1$ of the flat-plate formed body 11 is referred to as the "reference thickness."

In the present disclosure, as described below, since the reinforced fiber includes the slit portions 13a, the reinforced fiber can flow and/or stretch together with the resin composition in the heating-pressurizing forming. Therefore, for example, in the T-shaped member 21 (at the second stage) in FIG. 1A, as the standing portion 20b is formed by the heating-pressurizing forming, the resin compositions and the reinforced fibers flow or stretch. As a result, a thickness $T_{21}$ of the substrate portion 20a becomes smaller (thinner) than the thickness of the flat-plate formed body 11, i.e., the reference thickness $T_1$ ($T_{21}<T_1$). Therefore, the substrate portion 20a of the T-shaped member 21 corresponds to the thin plate portion.

Further, in the convex member 22 (at the third stage in FIG. 1A), as the convex portion 20c is formed by the heating-pressurizing forming, the resin compositions and the reinforced fibers flow or stretch. As a result, a thickness $T_{22}$ of the convex portion 20c becomes smaller (thinner) than the reference thickness $T_1$ ($T_{22}<T_1$). Therefore, the convex portion 20c of the convex member 22 corresponds to the thin plate portion. In the example shown in FIG. 1A, since the resin compositions and the reinforced fibers do not flow or stretch in the substrate portion 20a of the convex member 22, the thickness of the substrate portion 20a of the convex member 22 remains at the reference thickness $T_1$.

Further, in the curved member 23 including the curved portion 20d, as the curved portion 20d is formed by the heating-pressurizing forming, the resin compositions and the reinforced fibers flow or stretch as a whole. As a result, a thickness $T_{23}$ of the curved member 23 is smaller (thinner) than the reference thickness $T_1$ ($T_{23}<T_1$). Therefore, the entire curved member 23 corresponds to the thin plate portion.

Since the resin compositions and the reinforced fibers flow and/or stretch in these thin plate portions, the laminated structure of the prepreg laminated body 10 before the forming is practically maintained in the thin plate portion. Therefore, although the thickness of the thin plate portion is smaller than the thickness (i.e., the reference thickness $T_1$) of the flat-plate formed body 11 not including the three-dimensional structure, the thin plate portion has an adequate strength characteristic. Since the laminated structure is maintained in the thin plate portion, strength calculation can be performed, and an increase in strength variation can also be suppressed.

It should be noted that although the thickness of the standing portion 20b that is the three-dimensional structure of the T-shaped member 21 is smaller than the reference thickness $T_1$, the laminated structure of the prepreg laminated body 10 is not maintained in the standing portion 20b, so that the standing portion 20b does not correspond to the thin plate portion. However, since the resin compositions and the reinforced fibers flow and stretch in the heating-pressurizing forming, the standing portion 20b has such a laminated structure that the reinforced fibers are bent so as to make a U-turn at a top (tip end) of the standing portion 20b. Therefore, the standing portion 20b also has an adequate strength characteristic. Further, the U-turn of the reinforced fibers at the top of the standing portion 20b can be regarded as a "curved portion" having a very small curvature radius.

It should be noted that the reference thickness $T_1$, i.e., the thickness of the flat-plate formed body 11 not including the three-dimensional structure does not always become a fixed thickness in accordance with the number of laminated layers of the prepreg laminated body 10 before the forming but can be set to any thickness in accordance with conditions of the heating-pressurizing forming in addition to the number of laminated layers of the prepreg laminated body 10 before the forming. In the present disclosure, the thickness is calculated by a calculation formula described below, and the calculated thickness is defined as the "reference thickness $T_1$." Actually, when the prepreg laminated body 10 is cured by using a known proper curing cycle, an actually measured value (actually measured thickness) of the thickness of the flat-plate formed body 11 after the curing and the calculated thickness coincide with each other with an adequate degree of accuracy (or are satisfactorily close to each other).

The thickness of the cured composite material can be determined based on an areal fiber weight Wf of a prepreg and a fiber volume content rate Vf of a cured formed body (cured object). The areal fiber weight Wf denotes the weight of fibrous materials per unit area in an assembly (cloth base material) of a fibrous material (reinforced fiber) constituting a prepreg. Typically, a prepreg is manufactured by impregnating an assembly (cloth base material) of a fibrous material with a resin material (or a resin composition). Therefore, when the areal fiber weight Wf is increased, the thickness of the prepreg increases, or for example, the texture of the cloth base material becomes dense.

As in the present disclosure, when forming a cured object (flat-plate formed body 11) without actively making the resin material flow out during the curing, a calculated thickness Tc of the cured object (flat-plate formed body 11) can be calculated based on Formula (1) below. In Formula (1), $\rho f$ denotes a fiber specific gravity of a prepreg. In the present disclosure, the calculated thickness Tc calculated by Formula (1) is regarded as the thickness of the flat-plate formed body 11 including the same laminated structure as the composite-material aircraft part but not including the three-dimensional structure, i.e., the calculated thickness Tc of Formula (1) is regarded as the reference thickness $T_1$ ($Tc=T_1$).

$$Tc=Wf/\rho f/Vf \quad (1)$$

As described below, the fiber volume content rate Vf is only preferred to be calculated based on a known rule. In the present disclosure, the fiber volume content rate Vf can be calculated based on, for example, Formula (2) below. In Formula (2), $\rho r$ denotes a resin specific gravity of a prepreg (in the present disclosure, a specific gravity of a resin material or a resin composition), and Wr denotes a resin content rate of a prepreg (in the present disclosure, a content rate of a resin material or a resin composition).

$$Vf=\rho r \times (1-Wr/100)/\{\rho f-(\rho f-\rho r)\times(1-Wr/100)\} \quad (2)$$

Generally, regarding commercially available prepregs, the areal fiber weight Wf, the resin content Wr, the fiber specific gravity $\rho f$, and the resin specific gravity $\rho r$ are shown in catalogs of manufacturers in many cases. The definition of the areal fiber weight Wf is described above. The resin content rate Wr denotes a weight percent of a resin material in a prepreg of unit weight. The fiber specific gravity $\rho f$ denotes a specific gravity of a fibrous material (reinforced fiber) in a prepreg constituted by a resin material (resin composition) and the fibrous material (reinforced fiber). The resin specific gravity $\rho r$ denotes a specific gravity of a resin material in a prepreg constituted by the resin material and a fibrous material.

Regarding the commercially available prepregs, manufacture tolerances are set for the areal fiber weight Wf, the resin content rate Wr, the fiber specific gravity $\rho f$, and the resin specific gravity $\rho r$. Therefore, the fiber volume content rate Vf calculated by Formula (2) and the calculated thickness Tc of the cured object calculated by Formula (1) also vary to some extent. Such variations of the calculated values due to the manufacture tolerances are regarded as falling within an allowable range in the present disclosure. Therefore, as described above, the actually measured thickness of the flat-plate formed body 11 and the calculated thickness Tc (reference thickness $T_1$) do not always coincide with each other and are only preferred to be close to each other within an allowable range.

A specific range of the thickness of the thin plate portion is not especially limited. For example, when the reference thickness $T_1$ is regarded as 100%, the thickness of the thin plate portion may be 60% or more and less than 100%. In the present disclosure, since the reinforced fiber includes the slit portions 13a, the reinforced fiber can be made to flow or stretch together with the resin composition in the press forming. However, such flowing or stretching of the reinforced fiber has a limit, and therefore, it is thought that basically, the thickness of the thin plate portion does not become less than 60% of the reference thickness $T_1$. Further, the thickness of the thin plate portion is only preferred to be smaller than the reference thickness $T_1$. Therefore, although the upper limit of the thickness of the thin plate portion is less than 100%, and it depends on various conditions, the thickness of the thin plate portion falls within a range of 70% to 97% of the reference thickness $T_1$ in many cases.

In the present disclosure, specific types of the reinforced fiber and the resin composition constituting the composite-material layer are not especially limited, and materials applicable to the aircraft parts can be suitably selected and used. A specific type of the reinforced fiber is not especially limited as long as the reinforced fiber can realize satisfactory physical properties (such as strength) of the aircraft part. Examples of the reinforced fiber include carbon fiber, polyester fiber, PBO (polyparaphenylene benzobisoxazole) fiber, boron fiber, aramid fiber, glass fiber, silica fiber (quartz fiber), silicon carbide (SiC) fiber, and nylon fiber. These reinforced fibers may be used alone or in combination of two or more. Among these, carbon fiber is preferably used especially in the field of aircrafts. Further, the type of usage of the reinforced fiber is not especially limited, but the reinforced fiber is typically used as a base material constituted by braid, woven fabric, knit fabric, nonwoven fabric, or the like.

The resin composition with which the reinforced fiber is impregnated is only preferred to contain a resin material which can be used as a matrix material (parent material) that supports a base material. Specific examples of the resin material include thermosetting resin and thermoplastic resin.

A specific type of the thermosetting resin is not especially limited. Typical examples of the thermosetting resin include epoxy resin, polyester resin, vinylester resin, phenol resin, cyanate ester resin, polyimide resin, and polyamide resin. These thermosetting resins may be used alone or in combination of plural types. Further, a more specific chemical structure of the thermosetting resin is not especially limited, and the thermosetting resin may be a polymer formed by polymerizing known various monomers or may be a copolymer formed by polymerizing monomers. Further, an average molecular weight, structures of a main chain and a side chain, and the like are not especially limited.

A specific type of the thermoplastic resin is not especially limited. However, engineering plastic, such as polyphenylene sulfide (PPS), polyether ether ketone (PEEK), and polyether imide (PEI), are preferably used especially in the field of aircraft parts. A more specific chemical structure of the thermoplastic resin is not especially limited, and the thermoplastic resin may be a polymer formed by polymerizing known various monomers or may be a copolymer formed by polymerizing monomers. Further, an average molecular weight, structures of a main chain and a side chain, and the like are not especially limited.

The matrix material of the composite material may be constituted only by the above described thermosetting resin or thermoplastic resin (i.e., the matrix material may be constituted by only a known resin material). However, the matrix material of the composite material may contain known curing agents, known curing accelerators, known reinforcing materials and fillers other than the fiber base material, and other known additives. A specific type, composition, and the like of the additives, such as the curing agents and the curing accelerators, are not especially limited, and the additive of a known type or composition may be suitably used.

To be specific, in the present disclosure, the matrix material may be a thermosetting resin composition containing the thermosetting resin and other components or may be a thermoplastic resin composition containing the thermoplastic resin and other components. Therefore, in the present disclosure, the composite material may be a "thermosetting" material constituted by the reinforced fiber and the thermosetting resin or by the reinforced fiber and the thermosetting resin composition or may be a "thermoplastic" material constituted by the reinforced fiber and the thermoplastic resin or by the reinforced fiber and the thermoplastic resin composition.

As described above, the prepreg laminated body 10 that is a material of the aircraft part is formed by laminating the prepregs that are the semi-cured composite-material layers. The prepregs are sheet bodies each formed such that the base material constituted by the reinforced fiber is impregnated with the thermosetting resin composition or the thermoplastic resin composition and is then semi-cured. A specific configuration of the prepreg is not especially limited. Further, a specific configuration of the prepreg laminated body 10 formed by laminating the prepregs is not especially limited. For example, the shape of the prepreg, the number of prepregs laminated, a direction in which the prepregs are laminated, and the like can be suitably set in accordance with the shape, usage, type, and the like of the aircraft part to be obtained.

The prepreg laminated body 10 may include another material layer other than the prepregs, i.e., the composite-material layers. To be specific, the aircraft part according to the present disclosure may include another material other than the composite material. For example, a resin layer made of resin (or a resin composition) having stretchability may be laminated on the surface of the prepreg laminated body 10. The aircraft part including the surface on which the resin layer is formed can be manufactured by subjecting the prepreg laminated body 10 including the resin layer to the heating-pressurizing forming as described below. Examples of the resin layer on the surface of the aircraft part include: a layer which gives machinability (for example, which prevents burrs, fine splits, and the like from being generated during below-described hole formation); and a layer which improves the appearance of the aircraft part. However, the resin layer on the surface of the aircraft part is not especially limited.

As described above, the aircraft part according to the present disclosure is only preferred to be a part which includes the three-dimensional structure, such as the standing portion 20b, the convex portion 20c, or the curved portion 20d, and also includes the thin plate portion having the thickness smaller than the reference thickness $T_1$ while maintaining the laminated structure. A specific configuration of the aircraft part is not especially limited. For example, the height, angle, and thickness of the standing portion 20b, the size (spread area) and degree of projection of the convex portion 20c, the curvature of the convex portion 20c, the curvature of the curved portion 20d, and the like can be suitably set in accordance with the shape, usage, type, and the like of the aircraft part.

The number of three-dimensional structures included in the aircraft part according to the present disclosure may be one or plural. To be specific, the aircraft part may include only one standing portion 20b or convex portion 20c, may include standing portions 20b, or may include convex portions 20c. Or, the aircraft part may include plural types of three-dimensional structures. For example, the aircraft part may include one or more standing portions 20b and one or more convex portions 20c or may include the curved portion 20d, one or more standing portions 20b, and one or more convex portions 20c.

Further, a specific configuration of the curved portion 20d included in the aircraft part is not especially limited. For example, the curved portion 20d may be a one-dimensional curve or a two-dimensional curve. As shown in FIG. 1D, one example of the one-dimensional curve is a one-dimensional curved member 24 that curves in a first direction $D_1$ but does not curve (i.e., is linear) in a second direction $D_2$. Further, as shown in FIG. 1E, one example of the two-dimensional curve is a two-dimensional curved member 25 that curves in both the first direction $D_1$ and the second direction $D_2$.

The three-dimensional structure is not limited to the standing portion 20b, the convex portion 20c, and the curved portion 20d, and is only preferred to have a three-dimensional shape based on the substrate portion 20a. For example, the aircraft part may include, as the three-dimensional structure, a bent portion formed by bending at least one of peripheral edges of the substrate portion 20a or may include a concave portion as a partial thin plate portion included in the substrate portion 20a.

The content rate of the reinforced fiber in the aircraft part according to the present disclosure is not especially limited and may be suitably set in accordance with various physical properties or conditions preferred for the aircraft part. In the present disclosure, the content rate of the reinforced fiber in the aircraft part can be defined by the above-described fiber volume content rate Vf. The fiber volume content rate Vf is known in the fields of carbon fiber reinforced plastic (CFRP) and the like and is an index indicating, as a volume ratio, the amount (content) of fiber contained in the entire composite material. A method of calculating the fiber volume content rate Vf is performed based on, for example, JIS K7075 or ASTM D3171. Typically, the fiber volume content rate Vf is calculated by Formula (2) described above.

The fiber volume content rate Vf of the aircraft part according to the present disclosure is only preferred to fall within a range of 50% to 70% and preferably falls within a range of 55% to 65%. If the fiber volume content rate Vf is too low, the satisfactory physical properties and the like of the aircraft part may not be realized. In contrast, if the fiber volume content rate Vf is too high, the amount of resin composition that is the matrix material becomes too small, and therefore, the resin composition cannot satisfactorily support the reinforced fiber. In addition, even when the reinforced fiber includes the slit portions 13a, the amount of reinforced fiber becomes relatively too large, and therefore, the reinforced fiber may not satisfactorily flow or stretch during the press forming.

Hereinafter, the joint portion not included in the aircraft part according to the present disclosure will be specifically described with reference to FIG. 2. FIG. 2 schematically shows part of a conventional aircraft part 50. In the example shown in FIG. 2, part of the conventional aircraft part 50 has a flat plate configuration including three composite-material layers. However, the number of composite-material layers included in the actual aircraft part 50 is not limited to three and is only preferred to be two or more. Further, the shape of the actual aircraft part 50 is not limited to a flat plate shape, and the actual aircraft part 50 may include the above-described three-dimensional structure or another known structure.

In the aircraft part 50, one joint portion 15 is provided at reinforced fibers 14 constituting each composite-material layer. At the joint portion 15, one of the reinforced fibers 14 partially overlaps the other reinforced fiber 14. In the aircraft part, a width W of the joint portion 15 is, for example, 13 mm or more. Further, an interval between the joint portions 15 of the vertically adjacent composite-material layers is, for example, 25 mm or more. In the example shown in FIG. 2, the interval between the joint portion 15 of the reinforced fibers 14 of the lowermost composite-material layer (third layer) and the joint portion 15 of the reinforced fibers 14 of the intermediate composite-material layer (second layer) is only preferred to be 25 mm or more.

Conventionally, when the aircraft part includes the above-described three-dimensional structure, the prepreg laminated body 10 is first formed in a predetermined shape by, for example, manually laminating the prepregs and is then subjected to the heating-pressurizing forming in an autoclave. At this time, the prepregs are laminated such that as shown in FIG. 2, each layer includes the joint portion 15. If the prepreg laminated body 10 is formed by laminating the prepregs such that the joint portions 15 are not included, part of the aircraft part 50 obtained by the heating-pressurizing forming may not have adequate strength or adequate elastic modulus.

On the other hand, in the aircraft part according to the present disclosure, the reinforced fiber constituting the composite-material layer is constituted by a single continuous fiber and includes the partial slit portions. In other words, composite-material layers of the aircraft part according to the present disclosure include at least a composite-material layer (first composite-material layer) in which the reinforced fiber is constituted by a single continuous fiber not including the joint portion and includes the partial slit portions. Therefore, in the heating-pressurizing forming, the slit portions open (become the notch portions), and the reinforced fiber can flow and/or stretch together with the resin composition. As a result, the aircraft part including the three-dimensional structure that is at least one of the standing portion, the convex portion, or the curved portion can be manufactured without forming the joint portion 15 shown in FIG. 2.

Method of Manufacturing a Composite-Material Aircraft Part

Next, a method of manufacturing the composite-material aircraft part according to the present disclosure will be specifically described with reference to FIGS. 3A, 3B, and 4A to 4D.

Figure 3A:
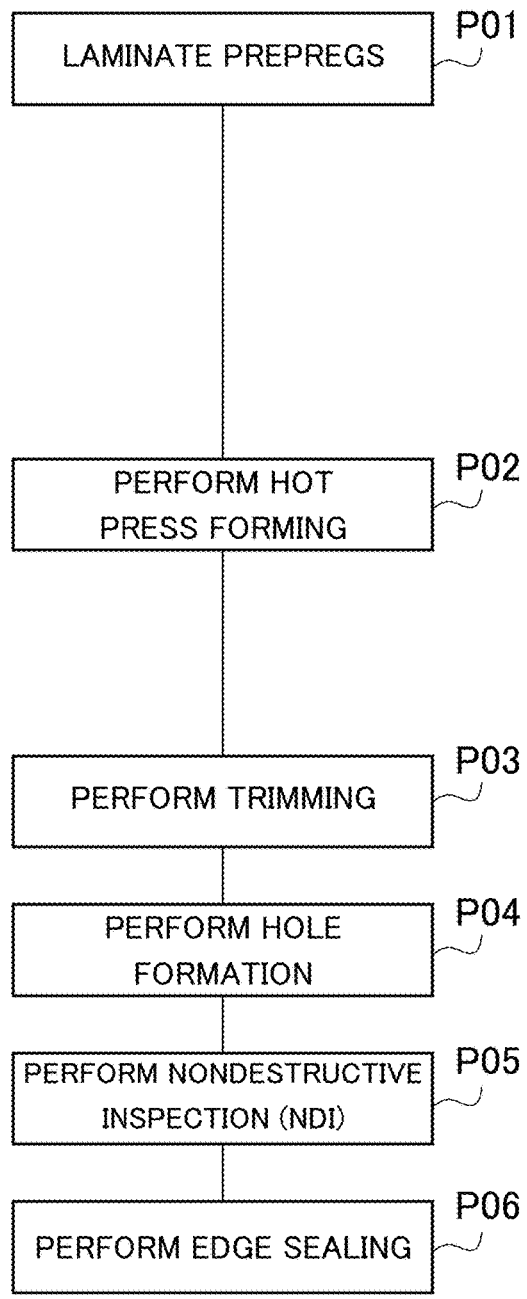
FIG. 3A is a process diagram showing a typical example of a method of manufacturing the composite-material aircraft part according to the embodiment of the present disclosure.
Figure 3B:
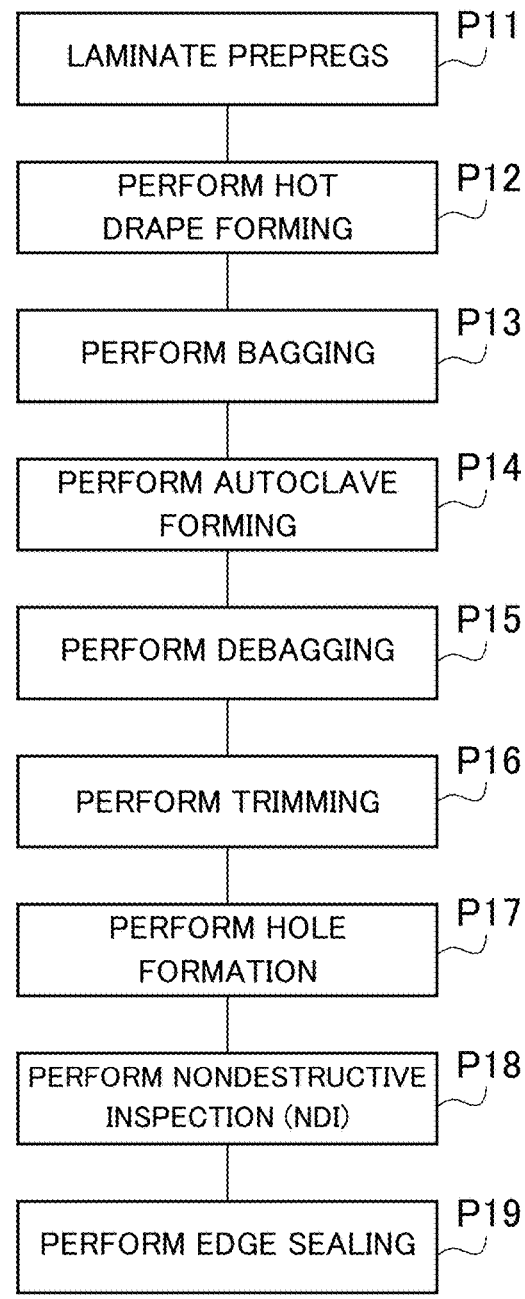
FIG. 3B is a process diagram showing a typical example of a method of manufacturing a conventional composite-material aircraft part.

A process diagram shown in FIG. 3A shows typical steps performed when manufacturing the aircraft part shown in FIGS. 1A to 1C. Further, a process diagram shown in FIG. 3B shows typical steps performed when manufacturing a conventionally general aircraft part. Although steps to be executed differ depending on conditions, such as the type of the composite material, the type and shape of the prepreg, and the type, shape, and usage of the aircraft part, each of the process diagrams shown in FIGS. 3A and 3B shows one example of a typical method of manufacturing a general aircraft part.

When manufacturing the aircraft part by a conventionally general manufacturing method, first, the prepreg laminated body 10 having a flat plate shape is prepared by laminating the prepregs (Step P11), and the three-dimensional structure is formed by subjecting the prepreg laminated body 10 to hot drape forming (Step P12). In the hot drape forming, the prepreg laminated body 10 is placed on a male jig and heated and pressurized under such a condition that the resin composition is not cured but flows. With this, the prepreg laminated body 10 including the three-dimensional structure is obtained. After that, by using a heat resistant film, a seal material, and the like, the prepreg laminated body 10 is subjected to bagging together with the male jig (Step P13) and is then subjected to autoclave molding (Step P14). Since the prepreg laminated body 10 is heated and pressurized by the autoclave molding, the prepreg laminated body 10 is cured while maintaining the three-dimensional structure, and thus, the cured object, i.e., the aircraft part is obtained.

After the autoclave molding is terminated, the male jig and the aircraft part in the bagged state are subjected to debagging, and with this, the aircraft part is separated from the male jig (Step P15). In the autoclave molding, residuals generated since the resin composition flows out and is then cured are generated around the cured object. Therefore, to remove the residuals, the cured object is subjected to trimming (Step P16). After the trimming, the cured object is subjected to hole formation (Step P17). After that, the cured object is subjected to nondestructive inspection (NDI) (Step P18). In the NDI, the presence or absence of flaws, such as delamination, void, and porosity, which influence (or may influence) the quality of the cured object is inspected. After the NDI, the cured object is subjected to edge sealing (Step P19). By the edge sealing, moisture absorption from the fibers exposed at trim edges by the trimming can be prevented, and electrocorrosion through the exposed fibers can also be prevented.

On the other hand, in the method of manufacturing the aircraft part according to the present disclosure, in FIG. 3A, the prepreg laminated body 10 is prepared by laminating the prepregs (Step P01) as with the conventional case, but the prepreg laminated body 10 is then subjected to hot press forming (heating-pressurizing forming) using a predetermined forming die (Step P02). At this time, the resin compositions flow in a cavity of the forming die, and the slit portions of the reinforced fibers open. With this, the reinforced fibers also flow or stretch while practically maintaining the laminated structure of the reinforced fibers. Therefore, the three-dimensional structure including the standing portion 20b, the convex portion 20c, or the curved portion 20d can be easily formed by the hot press forming. Since the slit portions of the reinforced fibers open, and the reinforced fibers flow or stretch, orientation angles of the reinforced fibers can be controlled to desired angles.

Further, in the hot press forming, since the slit portions 13a open while the laminated structure of the prepreg laminated body 10 is being maintained, the reinforced fibers locally flow or locally or entirely stretch, so that as described above, the thin plate portion that is smaller in thickness is generated. However, since the thin plate portion maintains the laminated structure, as described above, the thin plate portion can realize adequate strength and adequate elastic modulus as with portions other than the thin plate portion.

Therefore, according to the manufacturing method of the present disclosure, the composite-material aircraft part having a complex structure can be easily manufactured by the press forming, and conventional labor of laminating prepregs by cutting and pasting can be omitted. On this account, the manufacturing efficiency can be improved. Further, the thin plate portion has satisfactory strength and elastic modulus, so that even when the thin plate portion is formed, it is unnecessary to partially laminate a prepreg for adding strength or elastic modulus. Therefore, the weight of the composite-material aircraft part can be reduced, and the laminating work can be reduced.

Further, according to the manufacturing method of the present disclosure, the autoclave for performing heating and pressurizing in the conventional manufacturing method becomes unnecessary. Since the autoclave is more expensive than a facility for the hot press forming, the manufacturing method of the present disclosure can suppress an increase in cost for manufacturing facilities. When the autoclave is unnecessary, the bagging and the debagging are also unnecessary. The number of performed steps and the work hours relatively increase by the bagging and the debagging processes. Therefore, by omitting the bagging and the debagging, the manufacturing method can be made more efficient.

After the cured object, i.e., the aircraft part is obtained by the hot press forming, the aircraft part is subjected to the trimming (Step P03) and the hole formation (Step P04) as described above. After that, the aircraft part is subjected to the NDI (Step P05), and the cured object is then subjected to the edge sealing (Step P06). According to the manufacturing method of the present disclosure, in the hot press forming (Step P02), the flowing of the composite material (the reinforced fibers and the resin compositions) constituting the prepreg laminated body 10 can be controlled. Therefore, the edge sealing can be omitted in accordance with the shape of the aircraft part, the type of the composite material, the conditions of the hot press forming, and the like.

Hereinafter, the control of the flowing and stretching of the composite material in the method of manufacturing the aircraft part according to the present disclosure will be described. As described above, in the present disclosure, the composite-material layers constituting the prepreg laminated body 10 include the first composite-material layer, i.e., the reinforced fiber includes the slit region (region where the slit portions 13a are formed). Therefore, in the hot press forming, not only the resin composition but also the reinforced fiber can be made to flow or stretch.

The position of the slit region in the prepreg laminated body 10 is not especially limited, and a preferable position can be suitably set in accordance with the three-dimensional structure of the aircraft part to be obtained. In the example shown in FIG. 4A, when manufacturing a T-shaped member 21A shown at a second stage in FIG. 4A or a convex member 22A shown at a third stage in FIG. 4A, a slit region 10a (shown by hatching of cross lines in FIG. 4A) is formed at a middle portion of the prepreg laminated body 10A shown at an uppermost stage in FIG. 4A, the middle portion corresponding to the standing portion 20b or the convex portion 20c. The substrate portion 20a is located around the standing portion 20b in the T-shaped member 21A, and the substrate portion 20a is located around the convex portion 20c in the convex member 22A. Therefore, by providing the slit region 10a only at the middle portion corresponding to the three-dimensional structure, the control of the flowing of the composite material in the press forming can be performed.

In the press forming of the T-shaped member 21A, a forming die having cavities including a gap corresponding to the standing portion 20b is used for the prepreg laminated body 10A having a flat plate shape. With this, in the press forming, the reinforced fibers flow to the gap together with the resin compositions in the slit region 10a located at the middle portion. Therefore, the reinforced fibers spreading in a surface direction (a lateral direction or a horizontal direction) of the prepreg laminated body 10 flow so as to extend in a normal direction (a vertical direction or a perpendicular direction). With this, not only the resin compositions but also the reinforced fibers exist in the standing portion 20b, and in addition, the reinforced fibers have a satisfactory laminated state. Therefore, the standing portion 20b has satisfactory strength.

Figure 4A:
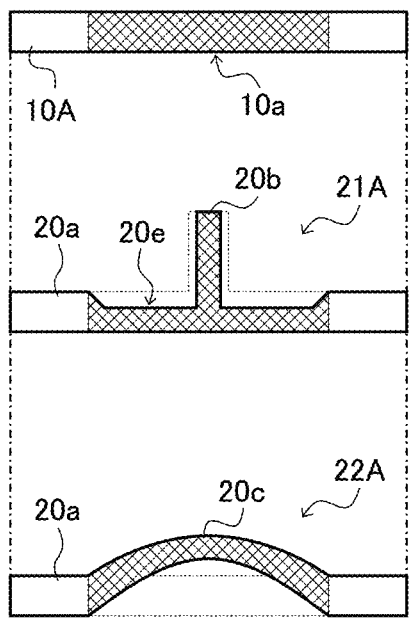
FIGS. 4A to 4D are schematic diagrams each showing a comparison between a region of the slit portions in the prepreg laminated body shown in FIG. 1A and a region of the slit portions and a thin plate portion in the composite-material aircraft part.

As shown in FIG. 4A, since the composite material flows from the slit region 10a at the middle portion to the standing portion 20b, the thickness of the middle portion located close to the standing portion 20b is small in the T-shaped member 21A. To be specific, in the T-shaped member 21A, a thin plate portion 20e is formed at the substrate portion 20a located close to the standing portion 20b. As described above, since the laminated structure of the prepreg laminated body 10 before the forming is satisfactorily maintained at the thin plate portion 20e, the thin plate portion 20e has satisfactory strength.

In the press forming of the convex member 22A, a forming die having a cavity corresponding to the convex portion 20c is used for the prepreg laminated body 10A having a flat plate shape. With this, in the press forming, the reinforced fibers stretch to the convex cavity together with the resin compositions in the slit region 10a located at the middle portion. Therefore, the convex portion 20c can be formed. In this case, the convex portion 20c corresponds to the thin plate portion. Since the convex portion 20c satisfactorily maintains the laminated structure of the reinforced fibers, the convex portion 20c has satisfactory strength.

In the example shown in FIG. 4A, in each of the T-shaped member 21A and the convex member 22A, the substrate portion 20a located around the three-dimensional structure (in the T-shaped member 21A, part of the substrate portion 20a except for the thin plate portion 20e) does not correspond to the slit region 10a. Therefore, the substrate portion 20a is not the thin plate portion and has the reference thickness $T_1$.

Figure 4B:
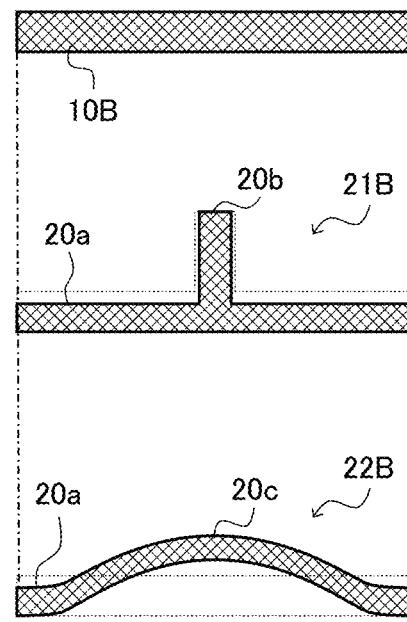

In the example shown in FIG. 4B, when manufacturing a T-shaped member 21B at a second stage in FIG. 4B or a convex member 22B at a third stage in FIG. 4B, an entire prepreg laminated body 10B at an uppermost stage in FIG. 4B may be the slit region (shown by hatching of cross lines in FIG. 4B).

In this example, in the press forming of the T-shaped member 21B or the convex member 22B, the entire composite material constituting the prepreg laminated body 10B can flow. Therefore, in the T-shaped member 21B, the standing portion 20b constituted by the reinforced fibers and the resin compositions is formed, and the entire substrate portion 20a becomes the thin plate portion. Further, in the convex member 22B, the convex portion 20c which maintains the laminated structure is formed, and the entire convex member 22B including the convex portion 20c and the substrate portion 20a becomes the thin plate portion.

In the example shown in FIG. 4A, the slit region is provided as part of the prepreg laminated body 10 in the surface direction. However, the position of the slit region is not limited to this, and the slit region may be provided as part of the prepreg laminated body 10 in a thickness direction. In the example shown in FIG. 4C, a slit region 10b is provided on one surface (an upper surface, for example) side of the prepreg laminated body 10C and is not provided on the other surface (a lower surface, for example) side. In the prepreg laminated body 10C configured as above, the upper surface side is constituted by the first composite-material layer(s), i.e., the composite-material layer(s) including the slit portions 13a, and the lower surface side is constituted by the second composite-material layer(s), i.e., the normal composite-material layer(s).

Figure 4C:
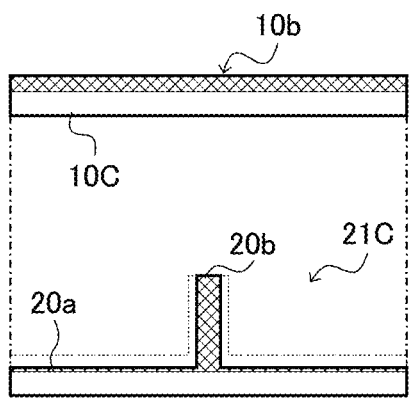

As with FIGS. 4A and 4B, FIG. 4C shows a T-shaped member 21C as one example of the aircraft part. In the press forming of the T-shaped member 21C, the reinforced fibers flow to the gap corresponding to the standing portion 20b together with the resin compositions in the slit region 10b located on the upper surface side. Therefore, the standing portion 20b constituted by the reinforced fibers and the resin compositions is formed. In addition, since the upper surface side of the substrate portion 20a flows and therefore becomes thin, the entire substrate portion 20a becomes the thin plate portion.

Figure 4D:
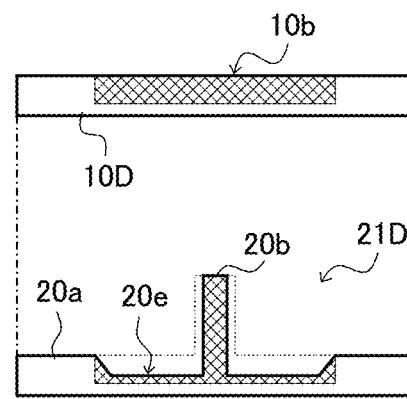

In the example shown in FIG. 4D, the slit region 10b is provided at the middle portion of one surface (an upper surface, for example) side of the prepreg laminated body 10D, and a portion around the slit region 10b (a peripheral portion other than the middle portion on the upper surface) and the other surface (a lower surface, for example) side are not the slit region. In the prepreg laminated body 10D configured as above, the composite-material layer(s) constituting the upper surface side is the first composite-material layer(s), and the slit region 10a (shown by hatching of cross lines in FIG. 4D) is provided at the middle portion corresponding to the standing portion 20b. On the other hand, the lower surface side of the prepreg laminated body 10D is constituted by the second composite-material layer(s), i.e., the normal composite-material layer(s).

As with the example shown in FIG. 4C, FIG. 4D shows a T-shaped member 21D as one example of the aircraft part. In the press forming of the T-shaped member 21D, the reinforced fibers flow to the gap corresponding to the standing portion 20b together with the resin compositions in the slit region 10b located at the middle portion of the upper surface side. Therefore, the standing portion 20b constituted by the reinforced fibers and the resin compositions is formed. In addition, since the middle portion of the upper surface side of the substrate portion 20a flows and therefore becomes thin, the middle portion of the substrate portion 20a (part of the substrate portion 20a which part is located adjacent to the standing portion 20b) becomes the thin plate portion 20e.

As above, according to the method of manufacturing the aircraft part of the present disclosure, the complex three-dimensional structure can be manufactured by the press forming by suitably setting the position of the slit region in the prepreg laminated body 10. Although it was conventionally possible to manufacture the aircraft part including the three-dimensional structure by subjecting the prepreg laminated body to the press forming, it was difficult to form the complex three-dimensional structure having satisfactory quality.

In the examples shown in FIGS. 4A to 4D (and in the example shown in FIG. 1A), the prepreg laminated body 10 has a flat plate shape. However, in the present disclosure, the shape of the prepreg laminated body 10 is not limited to the flat plate shape. In the present disclosure, the prepreg laminated body 10 may have a shape other than the flat plate shape in accordance with, for example, the structure of the aircraft part to be manufactured. For example, the prepreg laminated body 10 that has been curved to some extent is prepared and subjected to the press forming. With this, for example, the one-dimensional curved member 24 shown in FIG. 1D or the two-dimensional curved member 25 shown in FIG. 1E can be manufactured.

According to the manufacturing method of the present disclosure, for example, a curved or convex portion having a curvature radius R of about 4 mm can be manufactured although it has been conventionally difficult to manufacture such a curved or convex portion. Further, according to the manufacturing method of the present disclosure, the three-dimensional structure including at least one convex portion can be formed, and the three-dimensional structure including convex portions can also be formed. Further, according to the manufacturing method of the present disclosure, the three-dimensional structure including three or more convex portions can be formed although it has been conventionally difficult to manufacture such three-dimensional structure.

It was conventionally possible to manufacture the cured object including the above-described two-dimensional curved portion. However, actually, since the reinforced fibers do not adequately stretch, wrinkles are generated at a peripheral portion of the cured object. According to the manufacturing method of the present disclosure, for example, even the two-dimensional curved portion having a curvature radius of about 6 to 10 mm can be manufactured without wrinkles. Further, when the U-turn of the reinforced fibers at the top of the standing portion 20b is regarded as the "curved portion," the curvature radius R of the top of the standing portion 20b can be set to less than 1.0 mm, for example.

Specific Examples of an Aircraft Part

Figure 5:
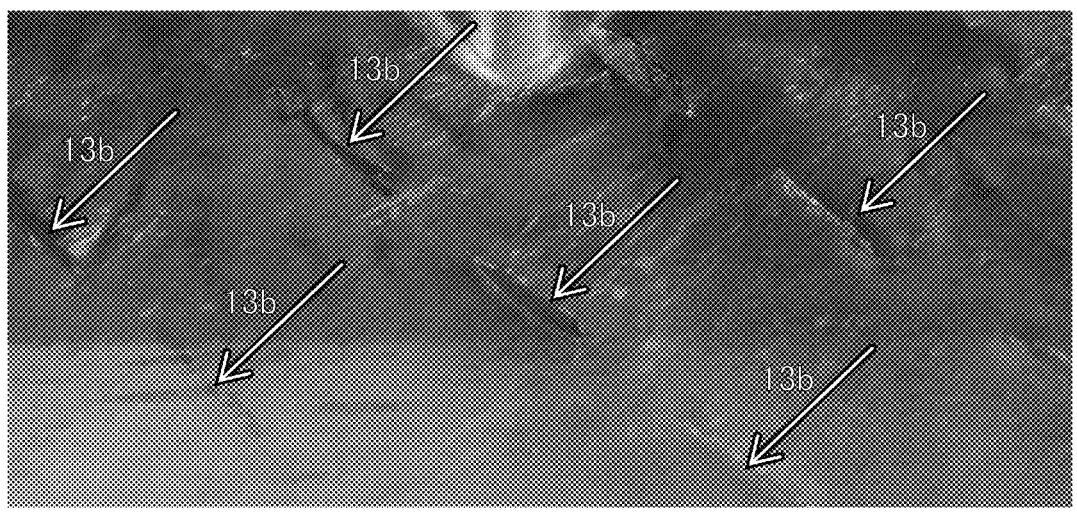
FIG. 5 is a diagram showing an exemplary embodiment of the notch portions shown in FIG. 1C.

Next, examples of the actually manufactured aircraft parts will be described with reference to FIGS. 5, 6A, 6B, and 7A to 7C. FIG. 5 shows an actual example of the notch portions 13b schematically shown in FIG. 1C. Such notch portions are observed on the surface of a substrate portion of a T-shaped member shown in FIG. 6A and on the surface of an L-shaped member shown in FIG. 7A. In the example shown in FIG. 5, one example of the notch portions 13b formed on the surface of the aircraft part is shown, and this is a characteristic configuration of the aircraft part according to the present disclosure.

Figure 6A:
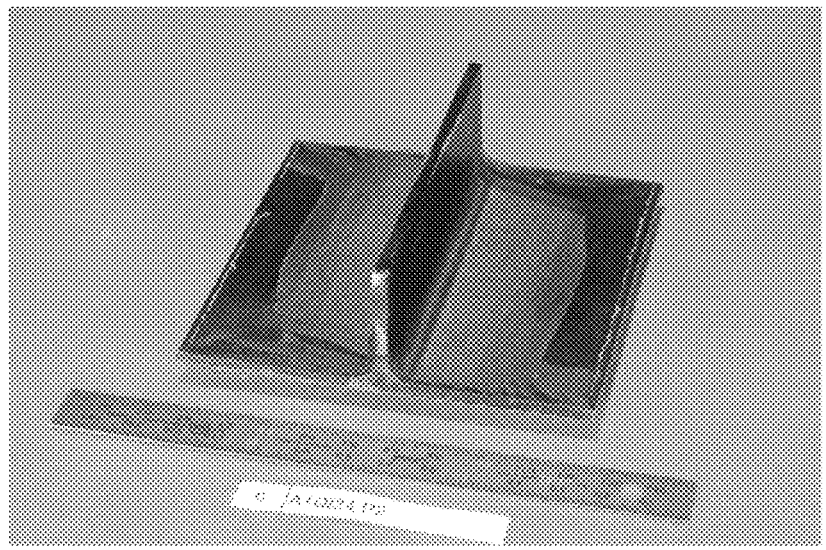
FIG. 6A is a diagram showing an exemplary embodiment of the composite-material aircraft part shown in FIG. 1A.
Figure 6B:
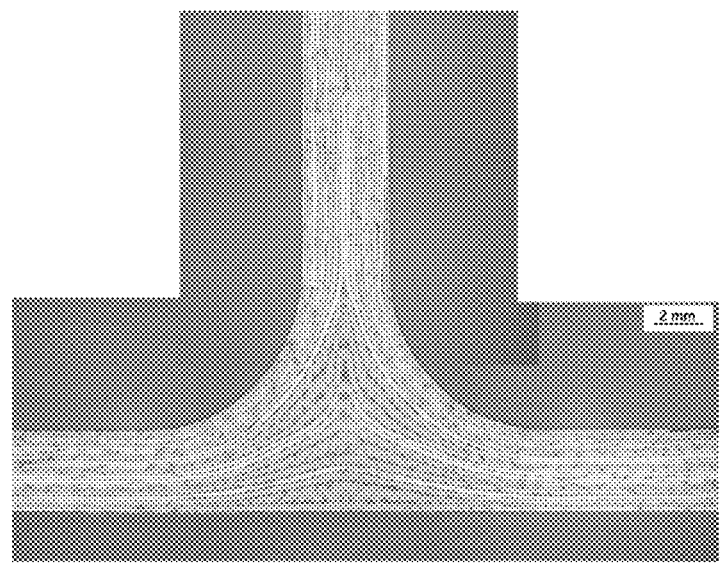
FIG. 6B is a diagram showing an exemplary embodiment of a partial section of the composite-material aircraft part shown in FIG. 6A.

As with the examples shown in FIGS. 1A and 4A to 4D, the T-shaped member shown in FIG. 6A has such a shape that a standing portion is provided so as to be perpendicular to the substrate portion. As shown in FIG. 6B, although the substrate portion of the T-shaped member is the thin plate portion that is small in thickness, the substrate portion satisfactorily maintains the laminated structure of the composite-material layers. Further, the standing portion branching from the substrate portion has the satisfactory laminated structure since the reinforced fibers flow together with the resin compositions as described above.

Figure 7A:
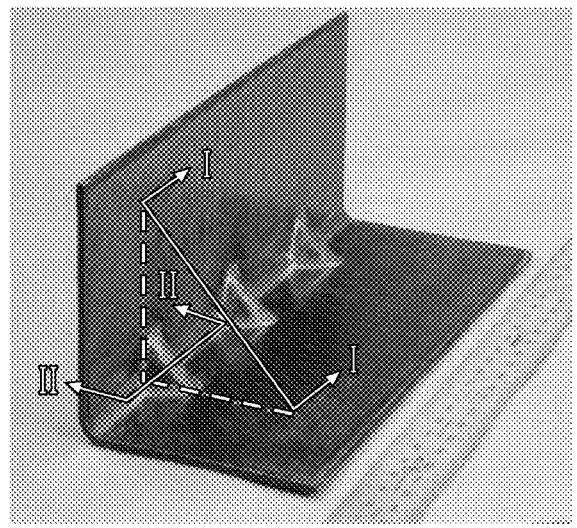
FIG. 7A is a diagram showing an exemplary embodiment of the composite-material aircraft part shown in FIG. 1A.
Figure 7B:
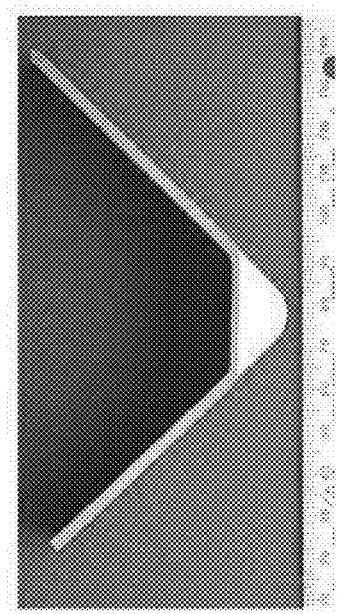
FIG. 7B is a diagram showing an exemplary embodiment of a section taken along line I-I in the composite-material aircraft part shown in FIG. 7A.
Figure 7C:
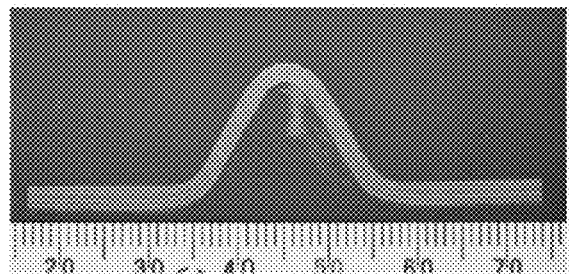
FIG. 7C is a diagram showing an exemplary embodiment of a section taken along line II-II in the composite-material aircraft part shown in FIG. 7A.

In the L-shaped member shown in FIG. 7A, three corrugate portions as the convex portions are formed. As shown by a vertical section in FIG. 7B, i.e., a section taken along line I-I of FIG. 7A, the corrugate portion is the thin plate portion but satisfactorily maintains the laminated structure of the composite-material layers. Further, as shown by a transverse section in FIG. 7C, i.e., a section taken along line II-II of FIG. 7A, the corrugate portion is the thin plate portion but satisfactorily maintains the laminated structure of the composite-material layers.

As above, the aircraft structure according to the present disclosure includes: the laminated structure including composite-material layers that are laminated, wherein each composite-material layer includes at least a reinforced fiber and a resin composition. The composite material aircraft structure is a three-dimensional structure that includes at least one of a standing structure, a convex structure, and a curved structure. The composite-material layers include at least a composite-material layer in which the reinforced fiber is a single continuous fiber, wherein the single continuous fiber includes a partial slit region. When a thickness of a flat-plate formed body including a same laminated structure as the composite-material aircraft structure, but not including the three-dimensional structure, is defined as a reference thickness, the composite-material aircraft structure includes a thin plate region which has a thickness that is smaller than the reference thickness while maintaining the laminated structure. The reinforced fiber further includes a notch region in which partial slits of the partial slit region are in an open state.

Further, in the method of manufacturing the aircraft structure according to the present disclosure, forming a laminated body by laminating composite-material layers, wherein each composite-material layer includes a reinforced fiber and a resin composition; and placing the laminated body at a forming die and subjecting the laminated body to heating-pressurizing forming. The composite-material layers include a composite-material layer that includes at least a single reinforced fiber and a resin composition, the single reinforced fiber including a slit region, the slit region including partial slits. The forming die includes a female structure and a male structure fitted to the female structure, and a cavity formed between the male structure and the female structure includes a region where at least one of a standing structure, a convex structure, or a curved structure is formed as a three-dimensional structure. the slit region is formed at the composite-material layer such that when the laminated body is placed on the forming die, the slit region is located on at least one of a region corresponding to the three-dimensional structure or a region adjacent to the region corresponding to the three-dimensional structure.

According to this configuration, the reinforced fiber is constituted by the single continuous fiber not including the joint portion and includes the partial slit portions. When the laminated body of the prepregs including such reinforced fibers is placed at the forming die and is subjected to the heating-pressurizing forming (hot press forming), the resin compositions flow in the cavity of the forming die, and the slit portions of the reinforced fibers open. With this, the reinforced fibers also flow or stretch although the laminated structure of the reinforced fibers is practically maintained, or the laminated structure does not change significantly. With this, the three-dimensional structure including the standing portion, the convex portion, or the curved portion can be easily formed by the heating-pressurizing forming. Therefore, the composite-material aircraft part having the complex structure can be easily manufactured by the press forming without using the autoclave molding, and the conventional labor of laminating the prepregs by cutting and pasting can be omitted. On this account, the manufacturing efficiency can be improved.

Further, according to the above configuration, when forming the three-dimensional structure, the slit portions open while the laminated structure is being maintained, and with this, the reinforced fibers locally flow, or the reinforced fibers locally or entirely stretch. Therefore, the obtained cured object (aircraft part) includes the notch portions and the thin plate portion that is small in thickness. Since the thin plate portion maintains the laminated structure, the thin plate portion can realize adequate strength and adequate elastic modulus as with portions other than the thin plate portion. Therefore, it is unnecessary to partially laminate a prepreg for adding strength or elastic modulus. On this account, the weight of the composite-material aircraft part can be reduced, and the laminating work can be reduced.

Composite-Material Aircraft Structure According to Present Disclosure and Manufacturing Method Thereof As above, the composite-material aircraft structure according to the present disclosure includes: the laminated structure including composite-material layers that are laminated, wherein each composite-material layer includes at least a reinforced fiber and a resin composition. The composite material aircraft structure is a three-dimensional structure that includes at least one of a standing structure, a convex structure, and a curved structure. The composite-material layers include at least a composite-material layer in which the reinforced fiber is a single continuous fiber, wherein the single continuous fiber includes a partial slit region. When a thickness of a flat-plate formed body including a same laminated structure as the composite-material aircraft structure, but not including the three-dimensional structure, is defined as a reference thickness, the composite-material aircraft structure includes a thin plate region which has a thickness that is smaller than the reference thickness while maintaining the laminated structure. The reinforced fiber further includes a notch region in which partial slits of the partial slit region are in an open state.

According to the above configuration, the reinforced fiber is constituted by the single continuous fiber not including the joint portion and includes the partial slit portion. When the laminated body of the prepregs including such reinforced fibers is placed at the forming die and is subjected to the heating-pressurizing forming (hot press forming), the resin compositions flow in the cavity of the forming die, and the slit portions of the reinforced fibers open. With this, the reinforced fibers also flow or stretch although the laminated structure of the reinforced fibers is practically maintained, or the laminated structure does not change significantly. With this, the three-dimensional structure including the standing portion, the convex portion, or the curved portion can be easily formed by the heating-pressurizing forming. Therefore, the composite-material aircraft part having the complex structure can be easily manufactured by the press forming without using the autoclave molding, and conventional labor of laminating the prepregs by cutting and pasting can be omitted. On this account, the manufacturing efficiency can be improved.

Further, according to the above configuration, when forming the three-dimensional structure, the slit portions open while the laminated structure is being maintained, and with this, the reinforced fibers locally flow, or the reinforced fibers locally or entirely stretch. Therefore, the obtained cured object (aircraft part) includes the notch portions and the thin plate portion that is small in thickness. Since the thin plate portion maintains the laminated structure, the thin plate portion can realize adequate strength and adequate elastic modulus as with portions other than the thin plate portion. Therefore, it is unnecessary to partially laminate a prepreg for adding strength or elastic modulus. On this account, the weight of the composite-material aircraft part can be reduced, and the laminating work can be reduced.

In the composite-material aircraft structure having the above configuration, the convex structure may include one or more convex structures.

Further, in the composite-material aircraft structure having the above configuration, the curved structure may include a one-dimensional curve or a two-dimensional curve.

Further, in the composite-material aircraft structure having the above configuration, when the reference thickness is regarded as 100%, a thickness of the thin plate region may be 60% or more and less than 100%.

Further, in the composite-material aircraft structure having the above configuration, the resin composition may contain thermosetting resin or thermoplastic resin.

Further, in the composite-material aircraft structure having the above configuration, the reinforced fiber may be a carbon fiber.

Further, in the composite-material aircraft structure having the above configuration, the reference thickness may be a calculated thickness of the flat-plate formed body, the calculated thickness being calculated by using a fiber volume content rate Vf of the flat-plate formed body and an areal fiber weight of each of not-yet-cured composite-material layers constituting a composite-material laminated body that is a body before the flat-plate formed body is cured.

Further, the method of manufacturing the composite-material aircraft structure according to the present disclosure includes: forming a laminated body by laminating composite-material layers, wherein each composite-material layer includes a reinforced fiber and a resin composition; and placing the laminated body at a forming die and subjecting the laminated body to heating-pressurizing forming. The composite-material layers include a composite-material layer that includes at least a single reinforced fiber and a resin composition, the single reinforced fiber including a slit region, the slit region including partial slits. The forming die includes a female structure and a male structure fitted to the female structure, and a cavity formed between the male structure and the female structure includes a region where at least one of a standing structure, a convex structure, or a curved structure is formed as a three-dimensional structure. the slit region is formed at the composite-material layer such that when the laminated body is placed on the forming die, the slit region is located on at least one of a region corresponding to the three-dimensional structure or a region adjacent to the region corresponding to the three-dimensional structure.

In the method of manufacturing the aircraft structure having the above configuration, when the composite-material layer including the slit region is referred to as a first composite-material layer, the composite-material layers may include a second composite-material layer which does not include the slit region and includes the resin composition and the single reinforced fiber.

Further, in the method of manufacturing the aircraft structure having the above configuration, the slit region may be formed at part of the composite-material layer or the entire composite-material layer.

Further, the composite-material aircraft structure according to the present disclosure includes: the laminated structure including composite-material layers that are laminated, wherein each composite-material layer includes at least a reinforced fiber and a resin composition. The composite material aircraft structure is a three-dimensional structure that includes at least one of a standing structure, a convex structure, and a curved structure. The composite-material layers include at least a composite-material layer in which the reinforced fiber is a single continuous fiber, wherein the single continuous fiber includes a partial slit region. When a thickness of a flat-plate formed body including a same laminated structure as the composite-material aircraft structure, but not including the three-dimensional structure, is defined as a reference thickness, the composite-material aircraft structure includes a thin plate region which has a thickness that is smaller than the reference thickness while maintaining the laminated structure.

The present disclosure is not limited to the above-described embodiment and may be modified in various ways within the scope of the claims, and embodiments obtained by suitably combining technical means disclosed in different embodiments and/or plural modified examples are included in the technical scope of the present disclosure.

From the foregoing explanation, many modifications and other embodiments of the present disclosure are obvious to one skilled in the art. Therefore, the foregoing explanation should be interpreted only as an example and is provided for the purpose of teaching the best mode for carrying out the present disclosure to one skilled in the art. The structures and/or functional details may be substantially modified within the scope of the present disclosure.

INDUSTRIAL APPLICABILITY

The present disclosure can be widely and suitably used in the field of manufacturing composite-material aircraft parts, especially in the field of manufacturing small aircraft parts, such as clips, having three-dimensional shapes by composite materials.

Advantageous Effects of Invention

By the above configuration, the present disclosure has an effect of being able to provide the composite-material aircraft part which is efficiently manufactured without using autoclave molding and has a three-dimensional shape.

REFERENCE SIGNS LIST

10: prepreg laminated body
11: flat-plate formed body
12: composite-material layer
13a: slit portion
13b: notch portion
14: reinforced fiber
15: joint portion
20: aircraft part
20a: substrate portion
20b: standing portion
20c: convex portion
20d: curved portion
20e: thin plate portion
21, 21A to 21D: T-shaped member
22, 22A, 22B: convex member
23: curved member
24: one-dimensional curved member
25: two-dimensional curved member
50: conventional aircraft part

The invention claimed is:

1. A composite-material aircraft structure comprising:
a laminated structure including composite-material layers that are laminated, wherein each composite-material layer includes at least a reinforced fiber and a resin composition,
wherein the composite material aircraft structure is a three-dimensional structure that includes a T-shaped structure, and wherein:
the composite-material layers include at least a composite-material layer in which the reinforced fiber is a single continuous fiber, wherein the single continuous fiber includes a partial slit region, and
when a thickness of a flat-plate formed body including a same laminated structure as the composite-material aircraft structure, but not including the three-dimensional structure, is defined as a reference thickness, the composite-material aircraft structure includes a thin plate region which has a thickness that is smaller than the reference thickness while maintaining the laminated structure, and the thin plate region is directly adjacent to the T-shaped structure on both sides, and
the reinforced fiber further includes a notch region in which partial slits of the partial slit region are in an open state.

2. The composite-material aircraft structure according to claim 1, wherein when the reference thickness is regarded as 100%, a thickness of the thin plate region is 60% or more and less than 100%.

3. The composite-material aircraft structure according to claim 1, wherein the resin composition contains thermosetting resin or thermoplastic resin.

4. The composite-material aircraft structure according to claim 1, wherein the reinforced fiber is a carbon fiber.

5. The composite-material aircraft structure according to claim 1, wherein the reference thickness is a calculated thickness of the flat-plate formed body, the calculated thickness being calculated by using a fiber volume content rate of the flat-plate formed body and an areal fiber weight of each of not-yet-cured composite-material layers constituting a composite-material laminated body that is a body before the flat-plate formed body is cured.

6. The composite-material aircraft structure according to claim 1, wherein the composite-material layers make a U-turn at a tip end of the T-shaped structure.

7. The composite-material aircraft structure according to claim 1, wherein the thin plate region is included in the partial slit region.

8. A composite-material aircraft structure comprising:
a laminated structure including composite-material layers that are laminated, wherein each composite-material layer includes at least a reinforced fiber and a resin composition,
wherein the composite material aircraft structure is a three-dimensional structure that includes a T-shaped structure, and wherein:
the composite-material layers include at least a composite-material layer in which the reinforced fiber is a single continuous fiber, wherein the single continuous fiber includes a partial slit region, and
when a thickness of a flat-plate formed body including a same laminated structure as the composite-material aircraft structure, but not including the three-dimensional structure, is defined as a reference thickness, the composite-material aircraft structure includes a thin plate region which has a thickness that is smaller than the reference thickness while maintaining the laminated structure, and the thin plate region is directly adjacent to the T-shaped structure on both sides, wherein the composite-material layers make a U-turn at a tip end of the T-shaped structure.

* * * * *